(12) United States Patent
Koh

(10) Patent No.: US 8,531,779 B2
(45) Date of Patent: Sep. 10, 2013

(54) LENS DRIVING MODULE AND IMAGE PICKUP APPARATUS THEREOF

(75) Inventor: Hong-Bin Koh, New Taipei (TW)

(73) Assignee: Altek Corporation, Hsinchu (TW)

( * ) Notice: Subject to any disclaimer, the term of this patent is extended or adjusted under 35 U.S.C. 154(b) by 93 days.

(21) Appl. No.: 13/398,058

(22) Filed: Feb. 16, 2012

(65) Prior Publication Data
US 2013/0155525 A1     Jun. 20, 2013

(30) Foreign Application Priority Data
Dec. 15, 2011   (TW) .............................. 100146495 A

(51) Int. Cl.
*G02B 15/14* (2006.01)
(52) U.S. Cl.
USPC .......................................... 359/694; 359/700
(58) Field of Classification Search
USPC ................................... 359/694–704
See application file for complete search history.

(56) References Cited

U.S. PATENT DOCUMENTS
2010/0296176 A1* 11/2010 Shinano et al. ............... 359/700

* cited by examiner

*Primary Examiner* — James Jones
(74) *Attorney, Agent, or Firm* — Muncy, Geissler, Olds & Lowe, PLLC

(57) ABSTRACT

A lens driving module and an image pickup apparatus thereof include a driving barrel, a first zooming barrel, a second zooming barrel and a focusing barrel. An inner wall of the driving barrel has at least one first groove, at least one second groove and at least one controlling convex dot. The first zooming barrel, the second zooming barrel and an outer wall of the focusing barrel have at least one first-direction convex dot, at least one second-direction convex dot and at least one third groove respectively. At least one first-direction convex dot, at least one second-direction convex dot and at least one controlling convex dot are inserted in at least one first groove, at least one second groove and at least one third groove respectively. When the driving barrel is rotated, the lens driving module performs a zooming or focusing operation by each groove and each convex dot.

18 Claims, 5 Drawing Sheets

LENS DRIVING MODULE AND IMAGE PICKUP APPARATUS THEREOF

CROSS-REFERENCE TO RELATED APPLICATION

This application claims the benefit of Taiwan Patent Application No. 100146495, filed on Dec. 15, 2011, in the Taiwan Intellectual Property Office, the disclosure of which is incorporated herein in its entirety by reference.

BACKGROUND OF THE INVENTION

1. Field of the Invention

The present invention relates to a lens driving module and an image pickup apparatus thereof, in particular to the lens driving module and the image pickup apparatus of the lens driving module using a design of a driving barrel and a slide groove to achieve the linking effect to perform zooming and focusing operations.

2. Description of the Related Art

As networks are developed rapidly, most people record the details of their personal daily life by digital cameras. To cope with such a huge market demand, it is a first priority for camera manufacturers to lower the production cost and simplify the production procedure of cameras.

Most cameras available in the market generally come with the zooming and focusing functions and adopt two motors for driving and controlling lens barrels to control the zooming and focusing operations of a lens respectively, but these driving motors require additional driving circuits and a larger component installation space, so as to incur more manufacturing time and labor and a higher production cost.

Therefore, designing an ideal lens driving apparatus capable of using a single driving module to achieve the zooming and focusing operations and overcome the problems of the conventional cameras that require separate driving modules for the zooming and focusing operations and incur more manufacturing time and labor and a higher production cost demands immediate attentions and feasible solutions.

In view of the shortcomings of the prior art, the inventor of the present invention designed a lens driving module and an image pickup apparatus to overcome the shortcomings of the prior art and enhance the industrial application.

SUMMARY OF THE INVENTION

Therefore, it is a primary objective of the present invention to provide a lens driving module and an image pickup apparatus thereof to overcome the problems of the conventional lens using several driving modules for the zooming and focusing operations, causing unnecessary wastes of the production cost, and requiring more manufacturing time.

To achieve the aforementioned objective, the present invention provides a lens driving module, comprising a driving barrel, a first zooming barrel, a second zooming barrel and a focusing barrel. Wherein, each driving barrel is hollow barrel structure having an end as a light entering end provided for entering a light of an object to be photographed, and the other end as an image end situated opposite to the light entering end, and the driving barrel further has at least one first groove, at least one second groove and at least one controlling convex dot formed on an inner wall of the driving barrel, and the at least one controlling convex dot is disposed at the image end of the driving barrel and protruded axially. The first zooming barrel is a hollow barrel structure installed at the light entering end of the driving barrel, and the at least one first groove has at least one first-direction convex dot formed on an outer wall of the first zooming barrel and embedded into the at least one first groove. The second zooming barrel is a hollow barrel structure installed at the image end of the driving barrel and has at least one second-direction convex dot formed on an outer wall of the second zooming barrel and corresponding to the at least one second groove and embedded into the at least one second groove. The focusing barrel is a hollow barrel structure installed at the image end of the driving barrel, and has at least one third groove formed on an outer wall of the focusing barrel and corresponding to the at least one controlling convex dot, and the at least one controlling convex dot is embedded into the at least one third groove. When the driving barrel is rotated, one side of the at least one first groove and the at least one second groove abuts the at least one first-direction convex dot and the at least one second-direction convex dot, such that the first zooming barrel and the second zooming barrel are moved in an axial direction to drive the lens driving module to perform a zooming operation, and the at least one controlling convex dot is moved along the at least one third groove to move the focusing barrel in an axial direction to drive the lens driving module to perform a focusing operation.

Preferably, the first zooming barrel and the second zooming barrel are situated in a stationary section when the at least one first-direction convex dot and the at least one second-direction convex dot are moved along the at least one first groove and the at least one second groove respectively and the relative distance between the first zooming barrel and the second zooming barrel remains unchanged.

Preferably, when the first zooming barrel and the second zooming barrel are situated in a stationary section, at least one controlling convex dot is moved along at least one third groove, and when the focusing barrel is moved in an axial direction, the focusing barrel is situated in a focusing section.

Preferably the lens driving module performs the focusing operation when the focusing barrel is situated in focusing section.

Preferably, the at least one first-direction convex dot and the at least one second-direction convex dot are moved along the grooves of the same shape respectively when the first zooming barrel and the second zooming barrel are situated in the stationary section.

Preferably, the at least one first-direction convex dot and the at least one second-direction convex dot are moved along each respective radial groove when the first zooming barrel and the second zooming barrel are situated in the stationary section.

Preferably, the first zooming barrel and the second zooming barrel are situated in a zooming section, when the at least one first-direction convex dot and the at least one second-direction convex dot are moved along each respective groove, and the relative distance between the first zooming barrel and the second zooming barrel is changed.

Preferably, the lens driving module performs the zooming operation when the first zooming barrel and the second zooming barrel are situated in the zooming section.

Preferably, when the first zooming barrel and the second zooming barrel are situated in the zooming section, the at least one first-direction convex dot is moved along at least one oblique groove or at least one curved groove of the at least one first groove, or the at least one second-direction convex dot is moved along at least one oblique groove or at least one curved groove of the at least one second groove.

According to another objective of the present invention, the prevent invention further provides an image pickup apparatus comprising a driving module, a driving barrel, a first zooming barrel, a second zooming barrel and a focusing barrel.

The driving barrel is a hollow barrel structure having an end as a light entering end provided for entering a light of an object to be photographed, and the other end as an image end situated opposite to the light entering end, and the driving barrel further has at least one first groove, at least one second groove and at least one controlling convex dot formed on an inner wall of the driving barrel, and the at least one controlling convex dot is disposed at the image end of the driving barrel and protruded axially. The driving module is provided for driving the driving barrel to rotate. The first zooming barrel is a hollow barrel structure installed at the light entering end of the driving barrel, and the at least one first groove having at least one first-direction convex dot formed on an outer wall of the first zooming barrel and embedded into the at least one first groove. The second zooming barrel is a hollow barrel structure installed at the image end of the driving barrel and has at least one second-direction convex dot formed on an outer wall of the second zooming barrel and corresponding to the at least one second groove and embedded into the at least one second groove. The focusing barrel is a hollow barrel structure installed at the image end of the driving barrel and proximate to the at least one controlling convex dot and corresponding to the at least one controlling convex dot and has at least one third groove formed on an outer wall of the focusing barrel and the at least one controlling convex dot being embedded into the at least one third groove. When the driving module drives the driving barrel to rotate, the driving module abuts the at least one first-direction convex dot and the at least one second-direction convex dot through one side of the at least one first groove and the at least one second groove, such that the first zooming barrel and the second zooming barrel are moved in an axial direction to drive each zooming lens barrel to perform a zooming operation, and the at least one controlling convex dot is moved along the at least one third groove to move the focusing barrel in an axial direction to drive the image pickup apparatus to perform a focusing operation.

Preferably, the first zooming barrel and the second zooming barrel are situated in a stationary section, when the at least one first-direction convex dot and the at least one second-direction convex dot are moved along the at least one first groove and the at least one second groove respectively, and the relative distance between the first zooming barrel and the second zooming barrel remains unchanged.

Preferably, the at least one controlling convex dot is moved along the at least one third groove when the first zooming barrel and the second zooming barrel are situated in the stationary section; and the focusing barrel situated in a focusing section when the focusing barrel is moved in an axial direction.

v, the image pickup apparatus performs a focusing operation when the focusing barrel is situated in the focusing section.

Preferably, the at least one first-direction convex dot and the at least one second-direction convex dot are moved along the grooves of the same shape respectively when the first zooming barrel and the second zooming barrel are situated in the stationary section.

Preferably, when the first zooming barrel and the second zooming barrel are situated in the stationary section, the at least one first-direction convex dot and the at least one second-direction convex dot are moved along each respective radial groove.

Preferably, the first zooming barrel and the second zooming barrel are situated in a zooming section when the at least one first-direction convex dot and the at least one second-direction convex dot are moved along each respective groove, and the relative distance between the first zooming barrel and the second zooming barrel is changed.

Preferably, the image pickup apparatus performs the zooming operation when the first zooming barrel and the second zooming barrel are situated in the zooming section.

Preferably, when the first zooming barrel and the second zooming barrel are situated in the zooming section, the at least one first-direction convex dot is moved along at least one oblique groove or at least one curved groove of the at least one first groove, or the at least one second-direction convex dot is moved along the at least one oblique groove or the at least one curved groove of the at least one second groove.

In summation, the lens driving module and the image pickup apparatus of the present invention have one or more of the following advantages:

(1) The lens driving module and the image pickup apparatus of the invention use the design of the driving barrel and the groove and convex dot of each lens barrel embedded with each other to achieve the effect of driving each lens barrel to complete zooming and focusing operations through a single driving module, so as to lower the production cost.

(2) The lens driving module and the image pickup apparatus of the invention use the design of a slide to link the focusing barrel to substitute the driving by separate driving modules, so as to achieve the effects of saving the manufacturing time and lowering the production and material costs.

BRIEF DESCRIPTION OF THE DRAWINGS

The detailed structure, operating principle and effects of the present invention will now be described in more details hereinafter with reference to the accompanying drawings that show various embodiments of the invention as follows.

DESCRIPTION OF THE PREFERRED EMBODIMENTS

The technical characteristics of the present invention will become apparent with the detailed description of the preferred embodiments accompanied with the illustration of related drawings as follows. It is noteworthy to point out that the drawings are provided for the purpose of illustrating the present invention, but they are not necessarily drawn according to the actual scale, or are intended for limiting the scope of the invention.

The lens driving module of the present invention mainly uses a single driving module (such as a motor) for zooming and focusing, and thus the lens driving module can be applied in an image pickup apparatus such as a digital camera, a camera phone, a Smartphone, a digital single-lens reflex camera or a digital video camera. Of course, the application of the invention is not limited to such image pickup apparatuses only.

It is noteworthy to point out that the drawings are provided for the purpose of illustrating the preferred embodiments of the lens driving module and the image pickup apparatus thereof in accordance with the present invention, and same numerals are used to represent the same respective elements.

Figure 1:
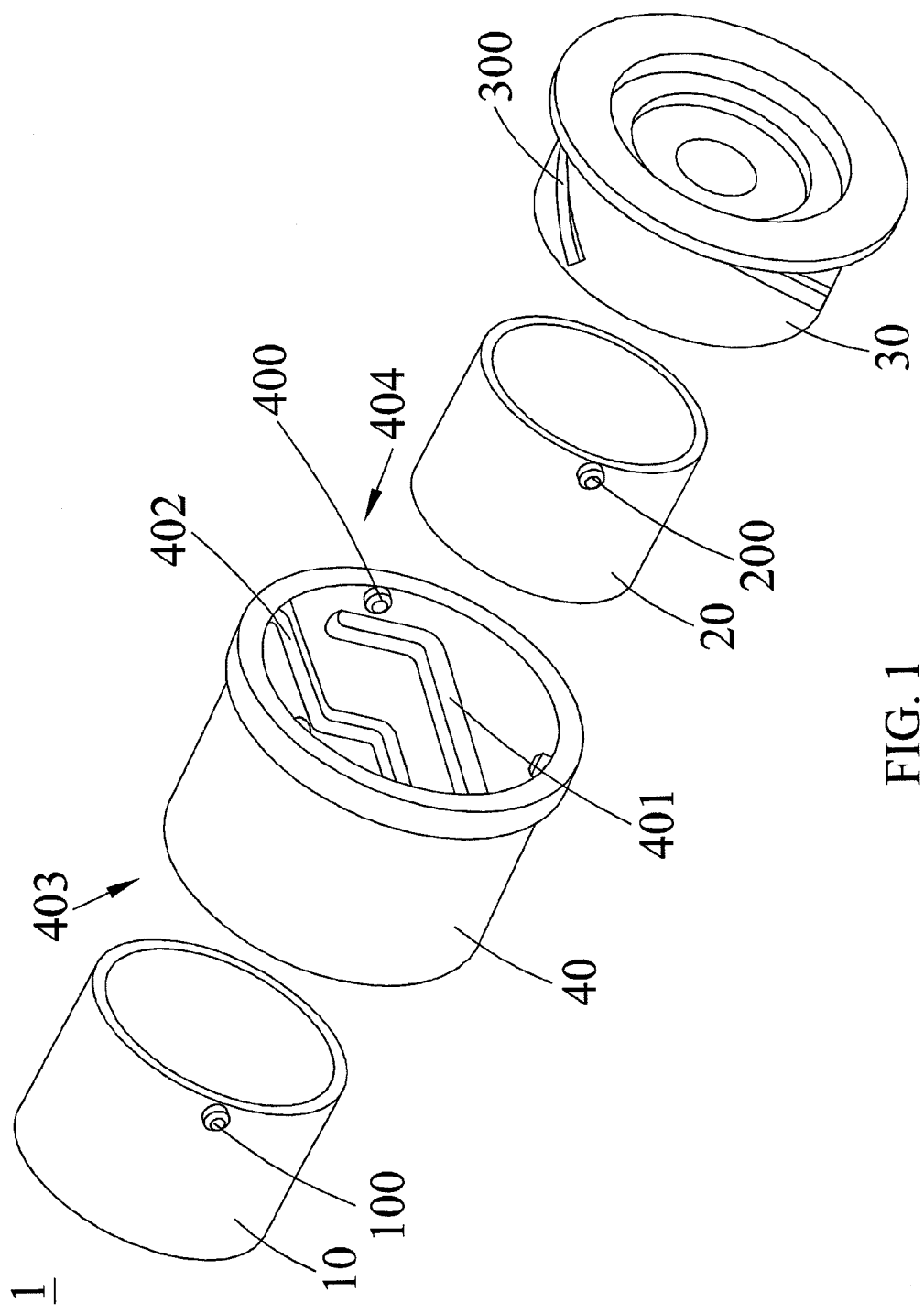
FIG. 1 is an exploded view of a lens driving module in accordance with a first preferred embodiment of the present invention.
Figure 2:
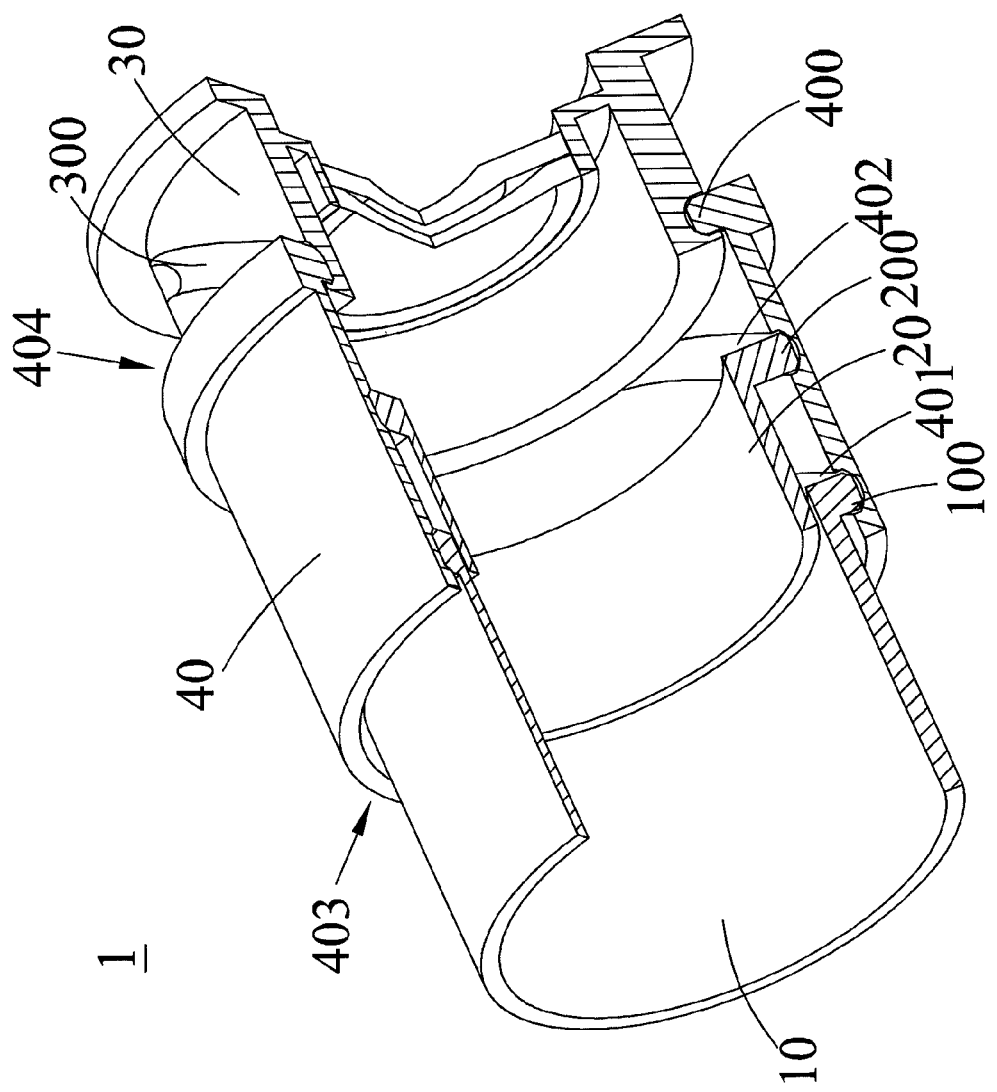
FIG. 2 is a schematic view of assembling a lens driving module in accordance with the first preferred embodiment of the present invention.

With reference to FIGS. 1 and 2 for an exploded view of a lens driving module and a schematic view of assembling a lens driving module in accordance with the first preferred embodiment of the present invention respectively, the lens driving module 1 comprises a first zooming barrel 10, a second zooming barrel 20, a focusing barrel 30 and a driving barrel 40. The driving barrel 40 is a hollow barrel structure having two ends which are a light entering end 403 and an image end 404, wherein the light entering end 403 is a port for entering a light of an object to be photographed. The driving barrel 40 has at least one controlling convex dot 400, at least one first groove 401 and at least one second groove 402 formed on an inner wall of the driving barrel 40. The at least one controlling convex dot 400 is formed on an inner wall at the image end 404 of the driving barrel 40 and protruded axially, and embedded into at least one third groove 300 on an outer wall of the focusing barrel 30. The first zooming barrel 10 and the second zooming barrel 20 are hollow barrel structures installed at the light entering end 403 and the image end 404 respectively. The first zooming barrel 10 has at least one first-direction convex dot 100 formed at an outer wall of the first zooming barrel 10 and embedded into at least one first groove 401. The second zooming barrel 20 has at least one second-direction convex dot 200 formed on an outer wall of the second zooming barrel 20 and embedded into at least one second groove 402. Wherein, the quantity of each type of lens barrels can be changed or increased appropriately according to the actual requirements.

When the driving barrel 40 is rotated, one side of the at least one first groove 401 abuts the at least one first-direction convex dot 100; one side of the at least one second groove 402 abuts the at least one second-direction convex dot 200, so that the at least one controlling convex dot 400 is moved along the at least one third groove 300. More specifically, the at least one first-direction convex dot 100 and the at least one second-direction convex dot 200 are moved along the shapes of the at least one first groove 401 and the at least one second groove 402 respectively, so as to perform a zooming operation of the first zooming barrel 10 and the second zooming barrel 20; and the at least one controlling convex dot 400 is moved along the shape of the at least one third groove 300 to drive the focusing barrel 30 to perform a focusing operation. Wherein, the at least one first groove 401, the at least one second groove 402 and the at least one third groove 300 can be in the shape of the at least one radial groove, the at least one curved groove, the at least one oblique groove or their combinations.

When the at least one first-direction convex dot 100 and the at least one second-direction convex dot 200 are moved along the at least one radial groove, the relative distance between the first zooming barrel 10 and the second zooming barrel 20 remains unchanged. Now, the first zooming barrel 10 and the second zooming barrel 20 are situated in a stationary section. Similarly, when the at least one first-direction convex dot 100 and the at least one second-direction convex dot 200 are moved along the grooves of the same shape, the relative distance between the first zooming barrel 10 and the second zooming barrel 20 remains unchanged, and the first zooming barrel 10 and the second zooming barrel 20 are also situated in a stationary section. On the contrary, if the at least one first-direction convex dot 100 and the at least one second-direction convex dot 200 are moved along different curved grooves or oblique grooves, the relative distance between the first zooming barrel 10 and the second zooming barrel 20 is changed. Now, the first zooming barrel 10 and the second zooming barrel 20 are situated in a zooming section. When the at least one first-direction convex dot 100 is moved along at least one curved groove or at least one oblique groove, and the at least one second-direction convex dot 200 is moved along at least one radial groove, the first zooming barrel 10 is situated in a zooming section. Similarly, when the at least one second-direction convex dot 200 is moved along at least one curved groove or at least one oblique groove and the at least one first-direction convex dot 100 is moved along at least one radial groove, the second zooming barrel 20 is situated in a zooming section. Further, when the at least one controlling convex dot 400 is moved along at least one curved groove or at least one oblique groove, the focusing barrel 30 situated in a focusing section; and when the at least one controlling convex dot 400 is moved along at least one radial groove, the focusing barrel 30 is situated in a stationary section.

When the first zooming barrel 10 and the second zooming barrel 20 are situated in a stationary section, the relative distance of the two lens barrels remains unchanged, and the lens barrels can sit still or can be moved in an axial direction. Now, the lens driving module 1 has a completed the zooming of a certain stage. On the other hand, when the first zooming barrel 10 and the second zooming barrel 20 are situated in a zooming section, the relative distance of the two lens barrels is changed, and one of the first zooming barrel 10 or the second zooming barrel 20 is moved axially, while the other remains still, or the two lens barrels are moved in an axial direction with different distances. Now, the lens driving module 1 can perform a zooming operation. Further, when the focusing barrel 30 is situated in the focusing section, the focusing barrel 30 is moved axially, and the lens driving module 1 performs the focusing operation. Wherein, when the first zooming barrel 10 and the second zooming barrel 20 are situated in zooming section, the focusing barrel 30 can be situated in the focusing section, so that the lens driving module 1 can perform a coarse focusing during the zooming operation, and a fine focusing operation can be performed after the zooming operation is finished, if needed.

Figure 3:
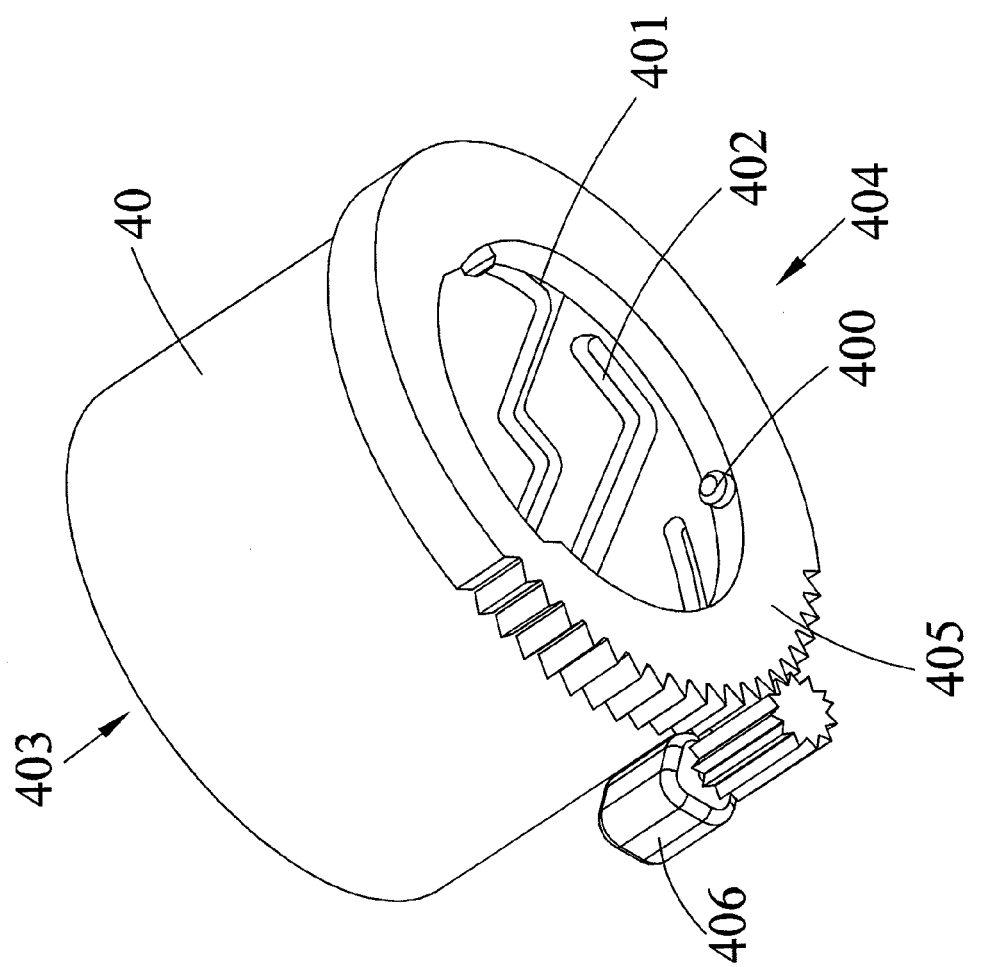
FIG. 3 is a schematic view of a driving barrel of a lens driving module in accordance with the first preferred embodiment of the present invention.
Figure 4:
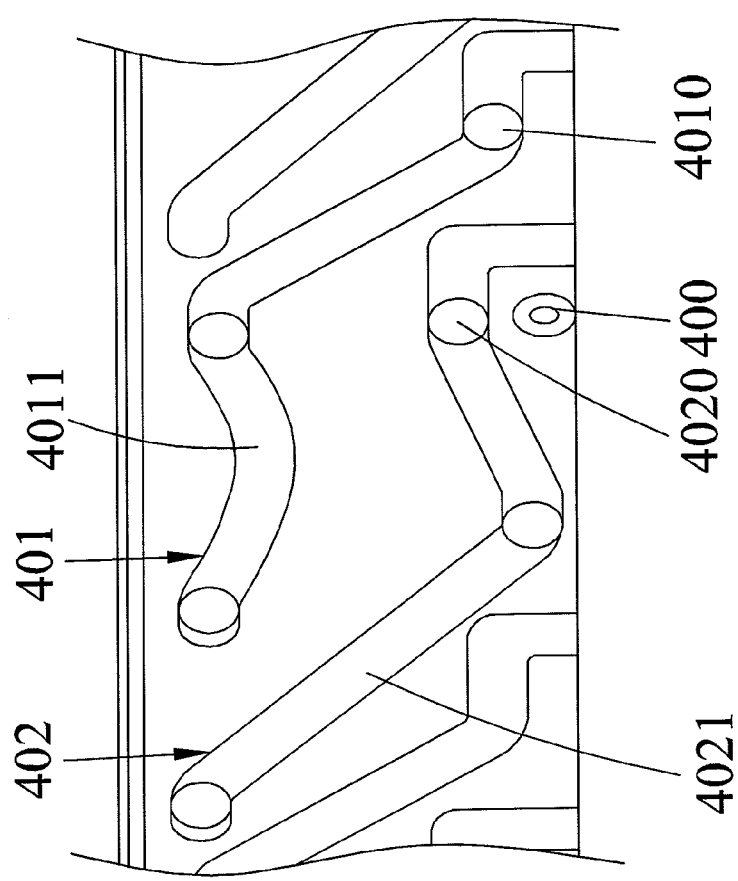
FIG. 4 is a schematic view of a partial inner wall of a driving barrel of a lens driving module in accordance with a first preferred embodiment of the present invention.

With reference to FIGS. 3 and 4 for a schematic view of a driving barrel of a lens driving module and a schematic view of a schematic view of a partial inner wall of a driving barrel of a lens driving module in accordance with a first preferred embodiment of the present invention respectively, the driving barrel 40 as shown in FIG. 3 is a hollow barrel structure with both ends as a light entering end 403 and an image end 404 respectively, wherein the light entering end 403 is a port for entering a light of an object to be photographed. The driving barrel 40 has at least one controlling convex dot 400, at least one first groove 401, at least one second groove 402 formed on an inner wall of the driving barrel 40. The at least one controlling convex dot 400 is formed on an inner wall of the image end 404 and protruded axially. A driving gear structure 405 is installed on an outer wall of the image end 404. In FIG. 4, the driving barrel 40 has a controlling convex dot 400, a first groove 401 and a second groove 402 formed on an inner wall the driving barrel 40, wherein the first grooves 401 has a first starting position 4010 and a first zooming section 4011; and the second groove 402 has a second starting position 4020 and a second zooming section 4021.

The connection and operation of the lens driving module 1 of this preferred embodiment are the same as described above, and thus will not described again. It is noteworthy to point out that the at least one first-direction convex dot 100, at least one second-direction convex dot 200 and at least one controlling convex dot 400 are moved along the at least one first groove 401, at least one second groove 402 and at least one third groove 300 respectively, and the at least one first groove 401, at least one second groove 402 and at least one third groove 300 are in the shapes of the at least one radial groove, at least one curved groove, at least one oblique groove or their combinations. When the at least one first-direction convex dot 100 and the at least one second-direction convex dot 200 are moved along the grooves of the same shape or moved along the radial groove, the relative distance between the first zooming barrel 10 and the second zooming barrel 20 remains unchanged. Now, the lens barrel driving module 1 has completed a zooming of a certain stage. When the at least one first-direction convex dot 100 and the at least one second-direction convex dot 200 are moved along the grooves of different shapes, the relative distance between the first zooming barrel 10 and the second zooming barrel 20 is changed. Now, the lens barrel driving module 1 performs a zooming operation. When the at least one controlling convex dot 400 is moved along the curved groove or the oblique groove of at least one third groove 300, the focusing barrel 30 is moved axially, and the lens driving module 1 performs a focusing operation; and when the at least one controlling convex dot 400 is moved along a radial groove, the lens driving module 1 has completed a focusing operation of a certain stage.

More specifically, when the driving module 406 drives driving barrel 40 to rotate through the driving gear structure 405, the first-direction convex dot 100 is situated at the first starting position 4010 and moved along the first groove 401 to the first zooming section 4011; and the second-direction convex dot 200 at the second starting position 4020 is moved along the second groove 402 to the second zooming section 4021. When the first-direction convex dot 100 is moved along the first zooming section 4011, and the second-direction convex dot 200 is moved along the second zooming section 4021, the relative distance between the first zooming barrel 10 and the second zooming barrel 20 is changed. Now, the lens driving module 1 performs a zooming. If the shape of both zooming sections has the same slope, and the relative distance between the first zooming barrel 10 and the second zooming barrel 20 remains unchanged. Now, the lens driving module 1 has completed the zooming of a certain stage. When the relative distance between the first zooming barrel 10 and the second zooming barrel 20 remains unchanged, the controlling convex dot 400 formed on the inner wall of the driving barrel 40 is moved along an oblique groove or a curved groove of the third groove 300 to drive the focusing barrel 30 to move axially, so as to drive the lens driving module 1 to perform a focusing operation. Wherein, the driving module 406 can be a direct-drive motor or a stepping motor. In addition, the grooves can be designed according to actual requirements, and this preferred embodiment simply uses the design of the groove as shown in FIG. 4 as an example, but the invention is not limited to such design only.

Figure 5:
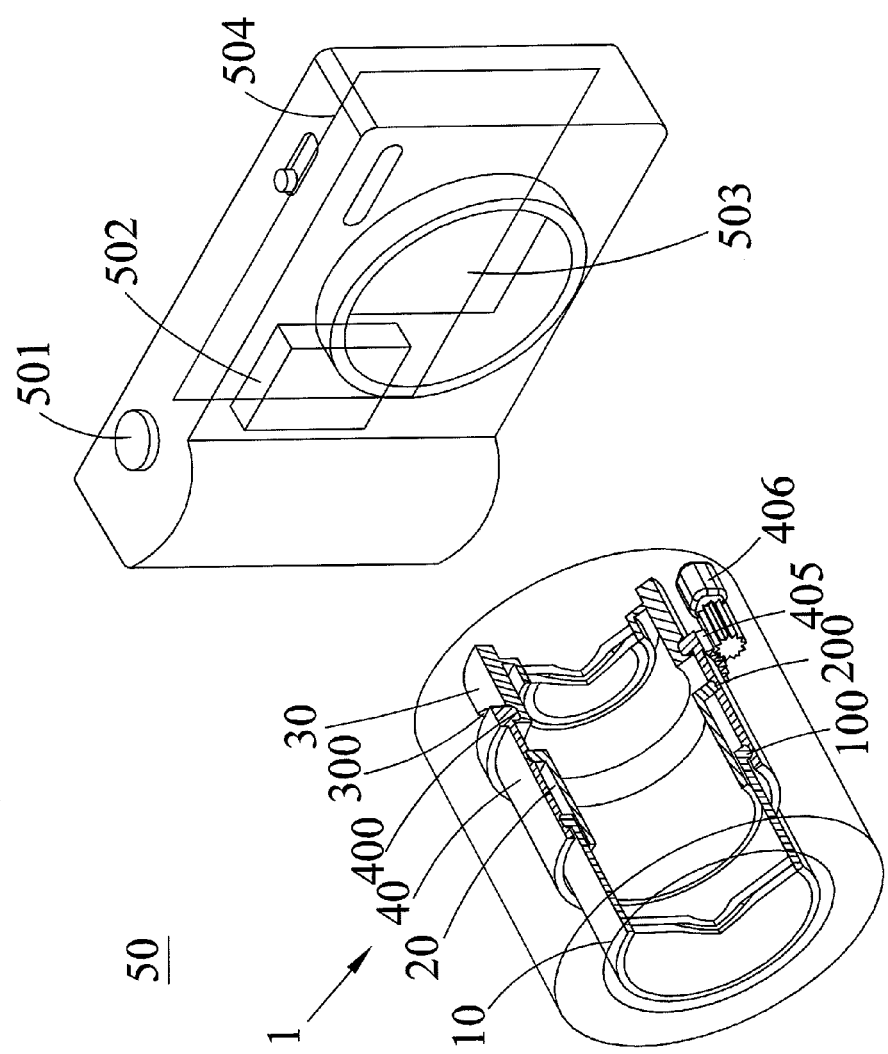
FIG. 5 is a schematic view of a lens driving module in accordance with a second preferred embodiment of the present invention.

With reference to FIG. 5 for a schematic view of a lens driving module in accordance with the second preferred embodiment of the present invention, the lens driving module 1 can be applied to an image pickup apparatus 50, wherein the image pickup apparatus 50 can be a digital camera, a camera phone, a Smart phone, a digital video camera, or any portable electronic device with a camera function. To facilitate describing the technical characteristics of the present invention, the digital camera is used in the preferred embodiment for illustrating the present invention, but the scope of the invention is not limited to such application only.

In FIG. 5, the image pickup apparatus 50 comprises a lens driving module 1, a driving module 406, a plurality of control buttons 501, a control unit 502, an image sensor 503 and a display unit 504. image sensor 503, wherein the display unit 504 electrically coupled to and installed outside the image pickup apparatus 50 can be a charge coupled device (CCD) or a complementary metal oxide semiconductor (CMOS) sensor. The plural control buttons 501 are installed outside the image pickup apparatus 50 and electrically coupled to the control unit 502.

The lens driving module 1 further comprises a first zooming barrel 10, a second zooming barrel 20, a focusing barrel 30 and a driving barrel 40. The connection and operation of the lens driving module 1 of this preferred embodiment are the same as the first preferred embodiment, and thus they will not be described again. The driving module 406 drives the driving barrel 40 to move the first zooming barrel 10, the second zooming barrel 20 and the focusing barrel 30 axially to drive the image pickup apparatus 50 to perform the zooming and focusing operations. The control unit 502 is electrically coupled to the driving module 406 and provided for controlling the operation of the driving module 406, and the control unit 502 can be a microprocessor control unit, a central processing unit (CPU) or a micro-processing unit. When a user presses a plurality of control buttons 501, the control unit 502 drives the driving module 406 to further drive the lens driving module 1. After the user finishes capturing an image. The light of an object to be photographed enters into the image sensor 503 through the lens driving module 1. The image sensor 503 converts the light in to an image signal and transmits the image signal to the display unit 504 for the user's viewing. The display unit 504 can be a liquid crystal display, (LCD) or a touch LCD.

When the user presses the plurality of control buttons 501, the control unit 502 receives a control signal for turning on the image pickup apparatus 50 and controlling the operation of the driving module 406. The driving module 406 drives the driving barrel 40 to rotate. As the driving barrel 40 rotates, one side of the at least one first groove 401 and the at least one second groove 402 abuts the at least one first-direction convex dot 100 and the at least one second-direction convex dot 200, so that the first zooming barrel 10 and the second zooming barrel 20 ca moved axially, so that the image pickup apparatus 50 performs a zooming operation. As the driving barrel 40 rotates, the at least one controlling convex dot 400 is moved along the at least one third groove 300, so that the focusing barrel 30 is moved axially, so that the image pickup apparatus 50 performs a focusing operation. Wherein, the at least one first groove 401, at least one second groove 402 and at least one third groove 300 have the shapes of the at least one radial groove, at least one curved groove, at least one oblique groove or their combinations. When the at least one first-direction convex dot 100 and the at least one second-direction convex dot 200 are moved along the grooves with the same slope respectively, the first zooming barrel 10 and the second zooming barrel 20 are situated in a stationary section, and the relative distance between the two lens barrels remains unchanged. Now, the image pickup apparatus 50 has completed a zooming operation at that stage. When the at least one first-direction convex dot 100 and the at least one second-direction convex dot 200 are moved along the grooves with different slopes respectively, the first zooming barrel 10 and the second zooming barrel 20 are situated in a zooming section, and the relative distance between the two lens barrels is changed. Now, the image pickup apparatus 50 performs a zooming operation. When the at least one controlling convex dot 400 is moved along an oblique groove or a curved groove of the at least one third groove 300, the focusing barrel 30 is situated in a focusing section and moved axially. Now, the image pickup apparatus 50 performs a focusing operation. When the at least one controlling convex dot 400 is moved along a radial groove of the at least one third groove 300, the focusing barrel 30 is situated in a stationary section, and the image pickup apparatus 50 completes the focusing operation.

After the driving module 406 drives the driving barrel 40 to rotate, the first zooming barrel 10 and the second zooming barrel 20 are situated in a zooming section, and the focusing barrel 30 is situated in a focusing section. Now, the image pickup apparatus 50 performs a zooming and a coarse focusing operation. After the user has confirmed the focused image, the image pickup apparatus 50 completes the zooming operation, and then the first zooming barrel 10 and the second zooming barrel 20 enter into the stationary section, and the focusing barrel 30 enters into the focusing section. When the focusing barrel 30 enters into the focusing section, the image pickup apparatus 50 performs a focusing operation. After the user confirms the desired focusing position, the focusing barrel 30 enters into the stationary section, and image pickup apparatus 50 completes the focusing operation. Now, the user can see the image clearly from the display unit 504, and the user can press the plurality of control buttons 501 to drive the image pickup apparatus 50 to capture an image.

In summation of the description above, the lens driving module and the image pickup apparatus of the present invention use the groove and convex dot of the driving barrels to guide and drive the zooming and focusing barrels to complete the zooming and focusing operations, so as to overcome the problems of the conventional cameras caused by requiring independent driving modules for the zooming and focusing operations.

What is claimed is:

1. A lens driving module, comprising:
    a driving barrel, being a hollow barrel structure, and having an end as a light entering end provided for entering a light of an object to be photographed, and the other end as an image end situated opposite to the light entering end, and the driving barrel further having at least one first groove, at least one second groove and at least one controlling convex dot formed on an inner wall of the driving barrel, and the at least one controlling convex dot being disposed at the image end of the driving barrel and protruded axially;
    a first zooming barrel, being a hollow barrel structure installed at the light entering end of the driving barrel, and the at least one first groove having at least one first-direction convex dot formed on an outer wall of the first zooming barrel and embedded into the at least one first groove;
    a second zooming barrel, being a hollow barrel structure installed at the image end of the driving barrel, and having at least one second-direction convex dot formed on an outer wall of the second zooming barrel and corresponding to the at least one second groove and embedded into the at least one second groove; and
    a focusing barrel, being a hollow barrel structure installed at the image end of the driving barrel, and having at least one third groove formed on an outer wall of the focusing barrel and corresponding to the at least one controlling convex dot, and the at least one controlling convex dot being embedded into the at least one third groove;
    wherein, when the driving barrel is rotated, one side of the at least one first groove and the at least one second groove abuts the at least one first-direction convex dot and the at least one second-direction convex dot, such that the first zooming barrel and the second zooming barrel are moved in an axial direction to drive the lens driving module to perform a zooming operation, and the at least one controlling convex dot is moved along the at least one third groove to move the focusing barrel in the axial direction to drive the lens driving module to perform a focusing operation.

2. The lens driving module of claim 1, wherein the first zooming barrel and the second zooming barrel are situated in a stationary section when the at least one first-direction convex dot and the at least one second-direction convex dot are moved along the at least one first groove and the at least one second groove respectively, and the relative distance between the first zooming barrel and the second zooming barrel remains unchanged.

3. The lens driving module of claim 2, wherein when the first zooming barrel and the second zooming barrel are situated in the stationary section, the at least one controlling convex dot is moved along the at least one third groove; and when the focusing barrel is moved in the axial direction, the focusing barrel is situated in a focusing section.

4. The lens driving module of claim 3, wherein the lens driving module performs the focusing operation when the focusing barrel is situated in the focusing section.

5. The lens driving module of claim 2, wherein the at least one first-direction convex dot and the at least one second-direction convex dot are moved along the grooves of the same shape respectively when the first zooming barrel and the second zooming barrel are situated in the stationary section.

6. The lens driving module of claim 2, wherein the at least one first-direction convex dot and the at least one second-direction convex dot are moved along each respective radial groove when the first zooming barrel and the second zooming barrel are situated in the stationary section.

7. The lens driving module of claim 1, wherein the first zooming barrel and the second zooming barrel are situated in a zooming section, when the at least one first-direction convex dot and the at least one second-direction convex dot are moved along each respective groove, and the relative distance between the first zooming barrel and the second zooming barrel is changed.

8. The lens driving module of claim 7, wherein the lens driving module performs the zooming operation when the first zooming barrel and the second zooming barrel are situated in the zooming section.

9. The lens driving module of claim 7, wherein when the first zooming barrel and the second zooming barrel are situated in the zooming section, the at least one first-direction convex dot is moved along at least one oblique groove or at least one curved groove of the at least one first groove, or the at least one second-direction convex dot is moved along the at least one oblique groove or the at least one curved groove of the at least one second groove.

10. An image pickup apparatus, comprising:
    a driving barrel, being a hollow barrel structure, and having an end as a light entering end provided for entering a light of an object to be photographed, and the other end as an image end situated opposite to the light entering end, and the driving barrel further having at least one first groove, at least one second groove and at least one controlling convex dot formed on an inner wall of the driving barrel, and the at least one controlling convex dot being disposed at the image end of the driving barrel and protruded axially;
    a driving module, for driving the driving barrel to rotate;
    a first zooming barrel, being a hollow barrel structure installed at the light entering end of the driving barrel, and the at least one first groove having at least one first-direction convex dot formed on an outer wall of the first zooming barrel and embedded into the at least one first groove;

a second zooming barrel, being a hollow barrel structure installed at the image end of the driving barrel, and having at least one second-direction convex dot formed on an outer wall of the second zooming barrel and corresponding to the at least one second groove and embedded into the at least one second groove; and a focusing barrel, being a hollow barrel structure installed at the image end of the driving barrel and proximate to the at least one controlling convex dot and corresponding to the at least one controlling convex dot, and having at least one third groove formed on an outer wall of the focusing barrel and the at least one controlling convex dot being embedded into the at least one third groove;

wherein, when the driving module drives the driving barrel to rotate, the driving module abuts the at least one first-direction convex dot and the at least one second-direction convex dot through one side of the at least one first groove and the at least one second groove, such that the first zooming barrel and the second zooming barrel are moved in an axial direction to drive each zooming lens barrel to perform a zooming operation, and the at least one controlling convex dot is moved along the at least one third groove to move the focusing barrel in the axial direction to drive the image pickup apparatus to complete a focusing operation.

11. The image pickup apparatus of claim 10, wherein the first zooming barrel and the second zooming barrel are situated in a stationary section the at least one first-direction convex dot and the at least one second-direction convex dot are moved along the at least one first groove and the at least one second groove respectively, and the relative distance between the first zooming barrel and the second zooming barrel remains unchanged.

12. The image pickup apparatus of claim 11, wherein the at least one controlling convex dot is moved along the at least one third groove when the first zooming barrel and the second zooming barrel are situated in the stationary section; and the focusing barrel situated in a focusing section when the focusing barrel is moved in the axial direction.

13. The image pickup apparatus of claim 12, wherein the image pickup apparatus performs a focusing operation when the focusing barrel is situated in the focusing section.

14. The image pickup apparatus of claim 11, wherein the at least one first-direction convex dot and the at least one second-direction convex dot are moved along the grooves of the same shape respectively when the first zooming barrel and the second zooming barrel are situated in the stationary section.

15. The image pickup apparatus of claim 11, wherein when the first zooming barrel and the second zooming barrel are situated in the stationary section, the at least one first-direction convex dot and the at least one second-direction convex dot are moved along each respective radial groove.

16. The image pickup apparatus of claim 10, wherein the first zooming barrel and the second zooming barrel are situated in a zooming section when the at least one first-direction convex dot and the at least one second-direction convex dot are moved along each respective groove, and the relative distance between the first zooming barrel and the second zooming barrel is changed.

17. The image pickup apparatus of claim 16, wherein the image pickup apparatus performs the zooming operation when the first zooming barrel and the second zooming barrel are situated in the zooming section.

18. The image pickup apparatus of claim 16, wherein when the first zooming barrel and the second zooming barrel are situated in the zooming section, the at least one first-direction convex dot is moved along at least one oblique groove or at least one curved groove of the at least one first groove, or the at least one second-direction convex dot is moved along the at least one oblique groove or the at least one curved groove of the at least one second groove.

* * * * *